(12) United States Patent
Wilson

(10) Patent No.: US 8,538,817 B2
(45) Date of Patent: Sep. 17, 2013

(54) SYSTEMS AND METHODS FOR PROTECTING CONSUMER PRIVACY IN ONLINE ADVERTISING ENVIRONMENTS

(75) Inventor: Jeffrey Todd Wilson, Ashburn, VA (US)

(73) Assignee: AOL Inc., Dulles, VA (US)

( * ) Notice: Subject to any disclaimer, the term of this patent is extended or adjusted under 35 U.S.C. 154(b) by 149 days.

(21) Appl. No.: 13/041,768

(22) Filed: Mar. 7, 2011

(65) Prior Publication Data

US 2011/0218866 A1 Sep. 8, 2011

Related U.S. Application Data

(60) Provisional application No. 61/311,526, filed on Mar. 8, 2010.

(51) Int. Cl.
*G06Q 30/00* (2012.01)
(52) U.S. Cl.
USPC ...................................................... 705/14.73
(58) Field of Classification Search
USPC ...................................................... 705/14.73
See application file for complete search history.

(56) References Cited

U.S. PATENT DOCUMENTS

| | | | |
|---|---|---|---|
| 6,510,458 | B1 | 1/2003 | Berstis et al. |
| 2001/0036224 | A1 | 11/2001 | Demello et al. |
| 2006/0130118 | A1 | 6/2006 | Damm |
| 2009/0287653 | A1 | 11/2009 | Bennett |

OTHER PUBLICATIONS

Thierer et al., "Privacy Solutions (Part 2): Adblock Plus", Technology Liberation Front, Sep. 8, 2008, found online at techliberation.com.*
"HTTP Request Fields", published by the World Wide Web Consortium (W3C), available online at w3.org/Protocols/HTTP/HTRQ_Headers.html, published 1992, pp. 3-4.*
"The global structure of an HTML document", HTML 4.01 Specification, Dec. 24, 1999, published by the World Wide Web Consortium (W3C), available online at w3.org/TR/html401/struct/global.html, p. 1.*
Thierer et al., "Privacy Solutions (Part 2): Adblock Plus", Technology Liberation Front, Sep. 8, 2008, found online at techliberation.com).*
"CLEAR (Control Links for Education and Advertising Responsibility)," Ad Notice Standard Specification and Implementation Guide v0.2, Nov. 18, 2009 (15 pages).
International Search Report in International Application No. PCT/US 11/27358 dated Nov. 29, 2011 (3 pages).
Written Opinion in International Application No. PCT/US 11/27358 dated Nov. 29, 2011 (4 pages).
Guha S., et al., "Privad: Rearchitecting Online Advertising for Privacy", Max Planck Institute for Software Systems, Technical Report: MPI-SWS-2009-004, Oct. 2, 2009 (30 pages).

\* cited by examiner

*Primary Examiner* — John G Weiss
*Assistant Examiner* — Scott C Anderson
(74) *Attorney, Agent, or Firm* — Finnegan, Henderson, Farabow, Garrett & Dunner, LLP

(57) ABSTRACT

Systems and methods are provided for protecting consumer privacy. According to one implementation, a method is provided for protecting consumer privacy in an online advertising environment. The method includes receiving an ad-related communication with associated ad notice metadata containing information about the ad-related communication, analyzing the ad notice metadata, and executing a consumer privacy response based on the analysis.

18 Claims, 7 Drawing Sheets

| AD NOTICE METADATA | |
|---|---|
| ADVERTISER NAME — 202 | ⋮ |
| ADVERTISER HOMEPAGE — 204 | ⋮ |
| AD NETWORK NAME — 206 | ⋮ |
| AD NETWORK CONSUMER PRIVACY PAGE — 208 | ⋮ |
| AD EXCHANGE NAME — 210 | ⋮ |
| AD EXCHANGE CONSUMER PRIVACY PAGE — 212 | ⋮ |
| TARGETED ADVERTISING INDICATOR — 214 | ⋮ |
| DATA PROVIDER — 216 | ⋮ |

*FIG. 2*

SYSTEMS AND METHODS FOR PROTECTING CONSUMER PRIVACY IN ONLINE ADVERTISING ENVIRONMENTS

RELATED APPLICATION

This application claims the benefit of priority of U.S. Provisional Patent Application No. 61/311,526, filed Mar. 8, 2010, the disclosure of which is expressly incorporated herein by reference in its entirety.

TECHNICAL FIELD

The present disclosure relates generally to consumer privacy techniques and related systems and methods. More particularly, and without limitation, the present disclosure relates to systems and methods for protecting consumer privacy in, for example, online advertising environments.

BACKGROUND

Due to the vast and increasing amount of traffic generated by consumers on the Internet, businesses continue to seek more effective means to advertise their goods and services online. In recent years, the online advertising environment has evolved to include five primary participants: "advertisers," "publishers," "ad networks," "audience intelligence providers," and "ad exchanges."

An "advertiser" is generally a merchant of goods services willing to pay to have its ads presented to consumers online. A "publisher" generally refers to the owner and operator of one or more content websites having available advertising space (e.g., "banners") for "lease" by advertisers. An "ad network" maintains an inventory of ads (e.g., on one or more servers) associated with various advertisers, and delivers the ads to publishers' websites in response to a trigger, such as a request from a publisher. An "ad exchange" essentially acts as an ad broker, matching the publishers' available advertising space with particular ads based on a variety of criteria, such as consumer information, bidding information, budget information, ad campaign information, or other criteria. An "audience intelligence provider," or "data provider," generally refers to a party that gathers information about consumers, such as demographic information, preferences, interests, etc., for use by the ad exchanges and/or ad networks in the process of selecting and serving a particular ad to a particular consumer. For example, websites affiliated with the ad networks and/or ad exchanges may gather information about consumers as they interact with the websites, and provide the gathered information (e.g., in the form of browser cookies) to the ad networks and/or ad exchanges for use in the ad selection process. In addition, data providers may even gather information about consumers in offline environments, such from paper transactions (e.g., mortgage application), and provide the consumer information to ad networks for use in online advertising.

Generally speaking, advertisers are willing to pay for three types consumer interactions with an ad: an "impression," "click," and "conversion." An "impression" refers to an instance of an ad being selected and served to a consumer on the website of a publisher. A "click" refers to an instance of a consumer actually clicking on or otherwise selecting an advertisement. A "conversion" refers to an instance of the consumer following through on the ad, such as by making a purchase, enrolling in a program, providing certain information, etc. Advertisers are generally willing to pay more per conversion than per click, and more per click than per impression.

In an effort to spend their online advertising budgets on those consumers who will most likely be interested in their ads, advertisers develop "ad campaigns" or marketing plans that identify certain types of consumers as targets for given products or services. In other cases, advertisers may be unsure of what types of consumers are most likely to respond to a given product and/or ad, and may wish to gather specific information about the consumers viewing various types of websites and responding to their ads. The advertisers may then develop a targeted ad campaign or marketing strategy (e.g., for a particular, good service, and/or ad) based on the gathered information. For example, an ad campaign relating to a new video game may target males ages 13-21 browsing certain game-related websites during a period surrounding the release of the game. The ad campaign may further specify budgeting information, such as prices the advertiser is willing to pay per impression, click, and conversion.

When a user visits the webpage of a publisher, the instance of the publisher webpage executing in the user's browser generates a request (e.g., an HTML request) for ads to fill any available ad space on the page. Based on information contained in the request, such pricing information, ad type information, a unique identifier associated with the user, etc., and on ad campaign information, the ad networks and/or ad exchanges facilitate "bids" on the available ad space. If the bid of a particular advertiser is accepted, the ad network and/or ad exchange select and serve a targeted ad associated with the winning advertiser for display on the user's browser.

Implementing targeted ad campaigns requires the audience intelligence providers to gather and process information about consumers, which is known as "profiling." One way intelligence providers gather consumer information is by tracking consumers as they surf the Internet using "cookies." Generally, a cookie is a small piece of data placed on the user's browser when the user visits a website belonging to ad network. The cookie usually contains, among other things, a unique identifier associated with the user. Depending on the practices of the ad network the cookie may contain other information, such as date and time information, an estimated zip code of the user, and browser history information. The cookie is stored for a specified time and returned whenever the user subsequently visits that website or another website in the ad network. By compiling and analyzing cookie information associated with a particular user gathered across multiple websites, a "user profile" indicating various attributes, preferences, and/or interests of the consumer can be built. This profile may then be used by ad networks and/or ad exchanges to support targeted ad campaigns. Of course, other consumer tracking methods may be used by intelligence providers to gather information about consumers and build user profiles.

Some people find such consumer tracking and profiling methods employed by online advertisers to be intrusive or invasive. These privacy concerns have encouraged online advertising companies to form self-regulating cooperatives to ensure that consumer privacy is protected in the advertising process. One such cooperative is Network Advertising Initiative (NAI), which provides various tools for consumers to educate themselves in relation to online advertising and protect their privacy online. For example, NAI's website allows users to access information about how targeted advertising works, the privacy policy of the ad networks participating in the cooperative, and other related information. In addition, NAI's website provides a tool allowing the user to selectively "opt-out" of targeted advertising by one or more of the participating networks.

Generally, opting-out is a process by which a user may avoid receiving further targeted advertising from one or more ad networks. Usually this involves replacing the unique identifier in the cookie associated with the ad network on the user's browser with some type of opt-out identifier, creating an opt-out cookie. When the user subsequently visits a website in the ad network, the opt-out cookie is returned, and the website can no longer track the user's browser history, build or update user profiles, etc. Moreover, to the extent that an ad is requested and delivered to the user, the ad is generic and not selected based on any particular information about the user.

NAI has also begun working on initiatives to provide greater transparency and control to consumers in relation to online advertising. One such proposal is known as the "CLEAR Ad Notice Guidelines" ("Guidelines"), which requires enabling a consumer to view detailed information about an ad served on a web page. Specifically, the Guidelines require ad networks and other online advertising entities to provide certain metadata in or with ad-related requests and responses (e.g., HTML requests and responses). The metadata includes information about the origin and nature of the ad, including the legal business name of the advertiser (e.g., Ford™), a link to the advertiser's homepage (e.g., www.ford.com), the legal business name of the ad network delivering the ad (e.g., Yahoo™), a link to the privacy page and/or advertising practices page of the ad network (e.g., www.yahoo.com/privacy), the legal business name of ad exchange or other party providing the matching or targeting services for the ad (e.g., DoubleClick™), a link to the ad exchange's or other matching party's privacy policy or opt-out page (e.g., www.doubleclick.com/privacy), and an indication of whether targeted advertising was used in the serving of the ad (e.g., Yes or No). The Guidelines also provide for displaying an "Ad Marker" icon on or near the ad, the selection of which causes the user's browser to display a graphical "Interstitial Overlay" associated with the ad, which is essentially a graphical representation of the ad metadata information described above.

SUMMARY

Consistent with embodiments of the present disclosure, systems and methods are provided for protecting consumer privacy. As further disclosed herein, systems and methods consistent with the present disclosure may be implemented with any combination of hardware, software, and/or firmware. In certain embodiments, computer-implemented systems and methods are provided for protecting consumer privacy in, for example, online advertising environments. Such systems and methods may leverage ad metadata and/or other information to protect consumer privacy.

In accordance with one exemplary embodiment, a method is provided for protecting consumer privacy in an online advertising environment. The method may include receiving an ad-related communication with associated ad notice metadata containing information about the ad-related communication, analyzing the ad notice metadata, and executing a consumer privacy response based on the analysis.

In accordance with another exemplary embodiment, a computer-readable storage medium is provided. The medium storing a computer program that, when executed by a computer, causes the computer to perform a method for protecting consumer privacy in an online advertising environment. The method may include receiving an ad-related communication with associated ad notice metadata containing information about the ad-related communication, analyzing the ad notice metadata, and executing a consumer privacy response based on the analysis.

In accordance with yet another exemplary embodiment, a method for protecting consumer privacy in an online advertising environment is disclosed. The method may include receiving an ad-related communication, receiving ad notice metadata containing information about the origin and nature of the ad-related communication, and analyzing the ad notice metadata. The method may further include, executing a consumer privacy response based on the analysis.

Additional features and advantages will be set forth in part in the description which follows, and in part will be obvious from the description, or may be learned by practice of the embodiments of the invention. For example, the features and advantages may be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 2 shows an exemplary representation of ad notice metadata, consistent with the disclosed embodiments;

DETAILED DESCRIPTION

Figure 1:
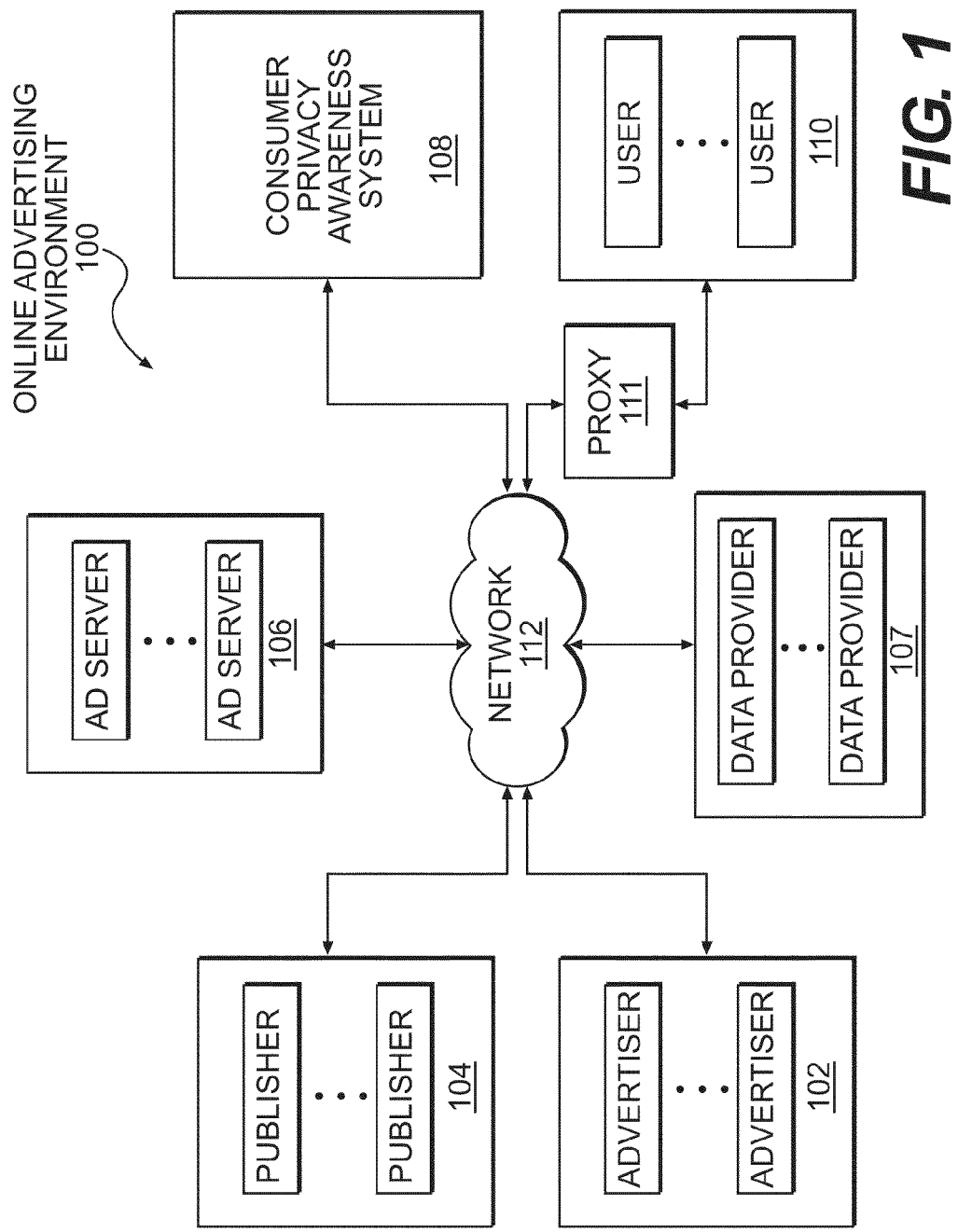
FIG. 1 shows a block diagram of an exemplary online advertising environment for providing consumer privacy, consistent with the disclosed embodiments.

Reference will now be made in detail to exemplary embodiments, examples of which are illustrated in the accompanying drawings. Wherever possible, the same reference numerals will be used throughout the drawings to refer to the same or like parts.

FIG. 1 illustrates an exemplary online advertising environment 100 in which consumer privacy may be provided, consistent with the disclosed embodiments. As shown, environment 100 may include advertisers 102, publishers 104, ad servers 106, data providers 107, a consumer privacy awareness system 108, and users 110, in communication via a network 112. Advertisers 102, publishers 104, ad servers 106, data providers 107, consumer privacy awareness system 108, and users 110 may comprise one or more computing devices, such as a personal computer, a desktop computer, a laptop computer, a handheld computing device, a mobile phone, smarphone, a server (or distributed server system), or any other type of computing device known in the art. Accordingly, each of advertisers 102, publishers 104, ad servers 106, data providers 107, consumer privacy awareness systems 108, and user devices 110 may include a processor (e.g., a central processing unit ("CPU")), a memory (e.g., RAM, ROM, etc.), a modem or other network communication interface, a user input device (e.g., keyboard, mouse, etc.), an output device (e.g., display), an internal storage device (e.g., hard drive), an external storage device (e.g., database on external servers, disk, flash memory, etc.), and/or any other computing elements necessary for processing and communicating data. Network 112 may include any combination of networks, such as for example, the Internet, a dedicated intranet, or any other type of electronic communication network known in the art.

Advertisers 102 may include one or more computing devices associated with any business entities (e.g., Ford™) having online advertisements, such as banner ads, pop-ups, etc. desired to be delivered to online users. Advertisers 102 may interact with publishers 104, ad servers 106, and/or data providers 107 via network 112 to communicate, among other things, ad information, targeting information, consumer information, budget information, bidding information, ad campaign information, and/or other related advertising information.

Publishers 104 may include one or more computing devices associated with any business entities having inventories of available online advertising space. For example, publishers 104 may include online content providers, search engines, e-mail services, content websites, news websites, or any other or websites attracting the online traffic of users 110. Publishers 104 may interact with advertisers 102 and/or ad servers 106 over network 112 to communicate site information, demographic information, browser cookie information, user information, ad cost information, ad inventory information, or any other information in connection with requesting ads for available advertising space on their websites. For example, in response to user devices 110 accessing websites associated with publishers 104, the web browsers of the user devices 110 of may generate and send to ad servers 106 over network 112 ad requests requesting ad servers 106 to serve ads to fill the available ad space on their websites. The ad requests may contain, for example, cookie information (e.g., a unique identifier), user information, and/or any other information that may be used to fulfill an ad request.

Ad servers 106 may include one or more computing devices associated with any business entities that store and/or process advertising information (e.g., ad campaign information) received from advertisers 102 and/or ad inventory information received from publishers 104, either directly or indirectly. For example, in certain embodiments, ad servers 106 may include one or more remote ad networks configured to serve ads in response to ad requests from publishers 104, based on the advertising information received from advertisers 102 and on ad request information received from publishers 104. Ad servers 106 may also be configured to serve ads based on contextual targeting of websites, search results, and/or user profile information. For example, in response to receiving an ad request from a publisher 104, ad servers 106 may facilitate bids on the available advertising space on the webpage of the publisher 104.

Data providers 107 may represent any entities that collect information about an online audience, such as users of user devices 110, and provide the collected information to ad servers 106, advertisers 102, ad exchanges and/or other entities for use in online advertising. For example, data providers 107 may include server computing systems associated with websites of publishers 104, ad servers 106, content providers, financial institutions, or other entities that track online users 110 using browser cookies or other techniques. In some embodiments, data providers 107 may include offline entities that capture information about ad targets, such as users associated with user devices 110, in the real world via paper transactions, such as financial transactions, media subscriptions, surveys, applications, etc. In some cases, data providers 107 may collect, index, and segment demographic and other information about users to build user profiles. The user profiles may then be provided to ad servers 106, advertisers 102, and/or ad exchanges to target users with online advertisements tailored to their interests.

As shown in FIG. 1, environment 100 may further include one or more proxy systems 111 between user devices 110 and network 112. Alternatively or additionally, one or more proxy systems 111 may be provided between advertisers 102, publishers 104, ad servers 106, and/or data providers 107 and network 112 (not shown). Proxy system 111 may include any computer system, application program, network, and/or other mechanism configured to act as an intermediary for requests (e.g., HTML requests to access online content) from user devices 110 to other entities on network 112, and for responses from the other entities on network 112 to user devices 110. For example, proxy system 111 may include any combination of proxy server computers, local area networks (LAN), private intranet systems, routers, network switches, firewalls, Internet Service Providers (ISP), or other intermediary systems that filter or process requests from users devices 110 to entities on network 112 and process responses from entities on network 112 directed to user devices 110.

The exemplary online advertising environment 100 of FIG. 1 may include other components or systems. For example, one or more ad exchange systems (not shown) may be included in or otherwise associated with ad servers 106. Such ad exchange systems may assist ad servers 106 in selecting, based on one or more criteria, a winning bid and serving the winning ad to the web page of a publisher.

FIG. 2 illustrates an exemplary representation of ad notice metadata 200 that may be served or transmitted along with ad-related communications. As used herein, "ad notice metadata" includes any data provided by entities on network 112 in connection with the ad-serving process to convey the nature and origin of an online advertisement, and thereby increase transparency in the online advertising process or otherwise protect online consumer privacy. For example, ad notice metadata 200 may include certain elements required by a self-regulating online advertising cooperative (e.g., NAI). Of course, ad notice metadata 200 may alternatively or additionally be based on the requirements, guidelines, or rules of other organizations, such as other self-regulating cooperatives of online advertisers, government regulatory bodies, law enforcement agencies, etc.

As used herein, "ad-related communication" refers to any communication sent by an entity on network 112 in connection with the ad-serving process. For example, ad-related communication may include a request sent by the web browser of a user device 110 to another entity on network 112, or a response received from an entity on network 112 by the web browser of a user device 110, in connection with the process of serving an online advertisement. For example, an ad-related communication includes an HTTP request for an advertisement sent by the web browser of a user 110 to an ad server 106 over network 112 when the user 110 accesses a web page of a publisher 104, such as a content site. In addition, ad-related communication includes an HTTP response received by the web browser of the user device 110 from the ad server 106, in response to an ad request, such as a response containing a uniform resource locator (URL) for a targeted ad or a URL for another ad server 106 that can provide ad targeted ad.

Consistent with the disclosed embodiments, ad notice metadata 200 may be sent with any ad-related communication, perhaps pursuant to the rules or guidelines of an online advertising regulatory body. For example, ad notice metadata 200 may be sent in addition to any other information required to support processing of an ad-related communication by the browser (e.g., HTML data for accommodating instrumentation of the ads or rich media associated with the ads) or an online entity. For example, ad notice metadata 200 may comprise Javascript (JS) metadata variables contained in the body of a Hypertext Transfer Protocol (HTTP) request or response, metadata variables contained in the header of an HTTP request or response, metadata information sent before or after an HTTP response or response, or any other type of metadata associated with an ad-related communication.

As shown in FIG. 2, in one embodiment, ad notice metadata 200 may include one or more elements, such as an advertiser name metadata element 202, an advertiser homepage metadata element 204, an ad network name metadata element 206, an ad network consumer privacy page metadata element 208, an ad exchange name metadata element 210, an ad exchange consumer privacy page metadata element 212, a targeted advertising indicator metadata element 214, and/or a data provider metadata element 216. But in other embodiments consistent with the disclosure, ad notice metadata 200 may include additional or different metadata to facilitate transparency in online advertising practices.

Advertiser name metadata element 202 may include information indicating, for example, the legal business name of the advertiser 102 (e.g., Ford™) associated with the advertisement. That is, advertiser name metadata element 202 may indicate the legal business name of the entity whose goods or services are advertised in the ad to be served. This advertiser name information, for example, may be provided by advertisers 102 and stored in a database (not shown) associated with one or more of ad servers 106. After receiving a request for an ad from the browser of a user device 110 visiting the web page of a publisher 104, ad sever 106 may determine the legal business name of the advertiser 102 associated with the selected ad, and may insert advertiser name metadata element 202 into its response.

Advertiser homepage metadata element 204 may include information indicating, for example, a uniform resource locator (URL), a uniform resource identifier (URI), a link, an IP address, or another resource identifier for the advertising entity's homepage (e.g., www.ford.com). This advertiser homepage information, for example, may be provided by advertisers 102 and stored the database associated with one or more of ad servers 106. After receiving a request for an ad from the browser of a user 110 visiting the web page of a publisher 104, ad sever 106 may determine the homepage of the advertiser 102 associated with the selected ad, and insert advertiser homepage metadata element 204 into its response.

Ad network name metadata element 206 may include information indicating, for example, the legal business name of the entity that owns the ad network serving the ad (e.g., Yahoo™). For example, the database associated with ad servers 106 may store the legal business name of the entity that owns or operates the ad network to which the ad servers 106 belong. After receiving a request for an ad from the browser of a user device 110 visiting the web page of a publisher 104, ad sever 106 may determine the legal business name of the ad network used in selecting the advertisement, and may insert ad network name metadata element 206 into its response.

Ad network consumer privacy page metadata element 208 may include information indicating, for example, a uniform resource locator (URL), a uniform resource identifier (URI), a link, an IP address, or another resource identifier for the consumer privacy page (e.g., opt-out page) and/or advertising practices page of the ad network serving the ad (e.g., www.yahoo.com/privacy). For example, the database associated with ad servers 106 may store the resource identifier(s) for the consumer privacy page and/or advertising practices page of the ad network to which ad servers 106 belong. After receiving a request for an ad from the browser of a user device 110 visiting the web page of a publisher 104, ad sever 106 may determine the resource locator of the consumer privacy page associated with the ad network associated with the selected ad, and may insert ad network consumer privacy page metadata element 208 into its response.

Ad exchange name metadata element 210 may include information indicating, for example, the legal business name of the entity that owns the ad exchange or other party providing the matching or targeting services for the ad being served (e.g., DoubleClick™). For example, upon completion of the ad selecting and/or bidding process, ad servers 106 may receive or identify the legal business name of the entity that owns or operates the ad exchange or other party providing the matching or targeting services for the selected ad. Ad servers 106 may then use this information to generate and provide ad notice metadata 200 along with its response to the ad request received from the browser of a user device 110.

Ad exchange consumer privacy page metadata element 212 may include information indicating, for example, a uniform resource locator (URL), a link, or another resource identifier for the consumer privacy page (e.g., opt-out page) and/or advertising practices page of the ad exchange or other party providing the matching or targeting services for the ad being served (e.g., www.doubleclick.com/privacy). For example, the database associated with ad servers 106 may store the resource identifier(s) for the consumer privacy pages and/or advertising practices pages of various ad exchanges and/or parties providing ad matching services. Upon identifying the ad exchange or other party providing the matching or targeting services for the selected ad, ad servers 106 may look up in the database a corresponding resource identifier for the consumer privacy page and/or advertising practices page of that particular party. Ad servers 106 may then use this retrieved information to generate and send ad notice metadata 200 along with its response to the ad request received from the browser of a user device 110.

Targeted advertising indication metadata element 214 may include information indicating, for example, whether targeted advertising was used in the ad-serving process (e.g., Yes or No). That is, metadata element 214 may indicate whether user profile information, user tracking information, and/or other information associated with the consumer (e.g., collected by data providers 107) was used in the process of selecting and serving the ad. For example, an ad server 106 may determine whether targeted advertising was used during the ad selection and bidding process, and may insert targeted advertising indication metadata element 214 into its response to its response to the ad request received from the browser of a user device 110.

Data provider metadata element 216 may include information about the data provider 107 that provided user profile information for use in selecting and serving an ad to a user of a user device 110. For example, data provider metadata element 216 may indicate that a certain data provider 107 gathered or collected, from online or offline sources, information about the user to specifically target that ad to the user 110. As discussed above, ad networks, ad exchanges, and/or other online advertising entities may receive information about users that is gathered by data providers 107 when the users engage in online activities, such as web browsing, creating online accounts or profiles, transmitting information over network 112, etc.—as well as in offline activities, such as filling out forms, applications, questionnaires, etc. In one embodiment, data provider metadata element 216 may include the legal business name, website, or other information regarding the data provider 107 whose user profile or segmenting information was used to select and serve an ad targeted specifically to the user. Depending on the particular ad notice requirements, an ad server 106, ad exchange, or other online advertising entity may determine the data provider 107 that collected user information used in the ad-targeting process, and may transmit data provider metadata element 216 in response to receiving an ad request from the web browser of a user device 110.

It is to be appreciated that ad notice metadata 200 may include additional or different metadata elements, depending upon the ad-notice requires of the particular online advertising regulatory body at issue.

Returning to FIG. 1, consumer privacy awareness system 108 may include one or more computing devices associated with any entities responsible ensuring consumer privacy standards in relation to online advertising. For example, privacy awareness systems 108 may include self-regulating cooperatives of advertising networks (e.g., networks of ad servers 106), such as the NAI; federal government bodies, such as the Bureau of Consumer Protection of the FTC; state or local government consumer protection agencies; and/or any other such entities.

Figure 3:
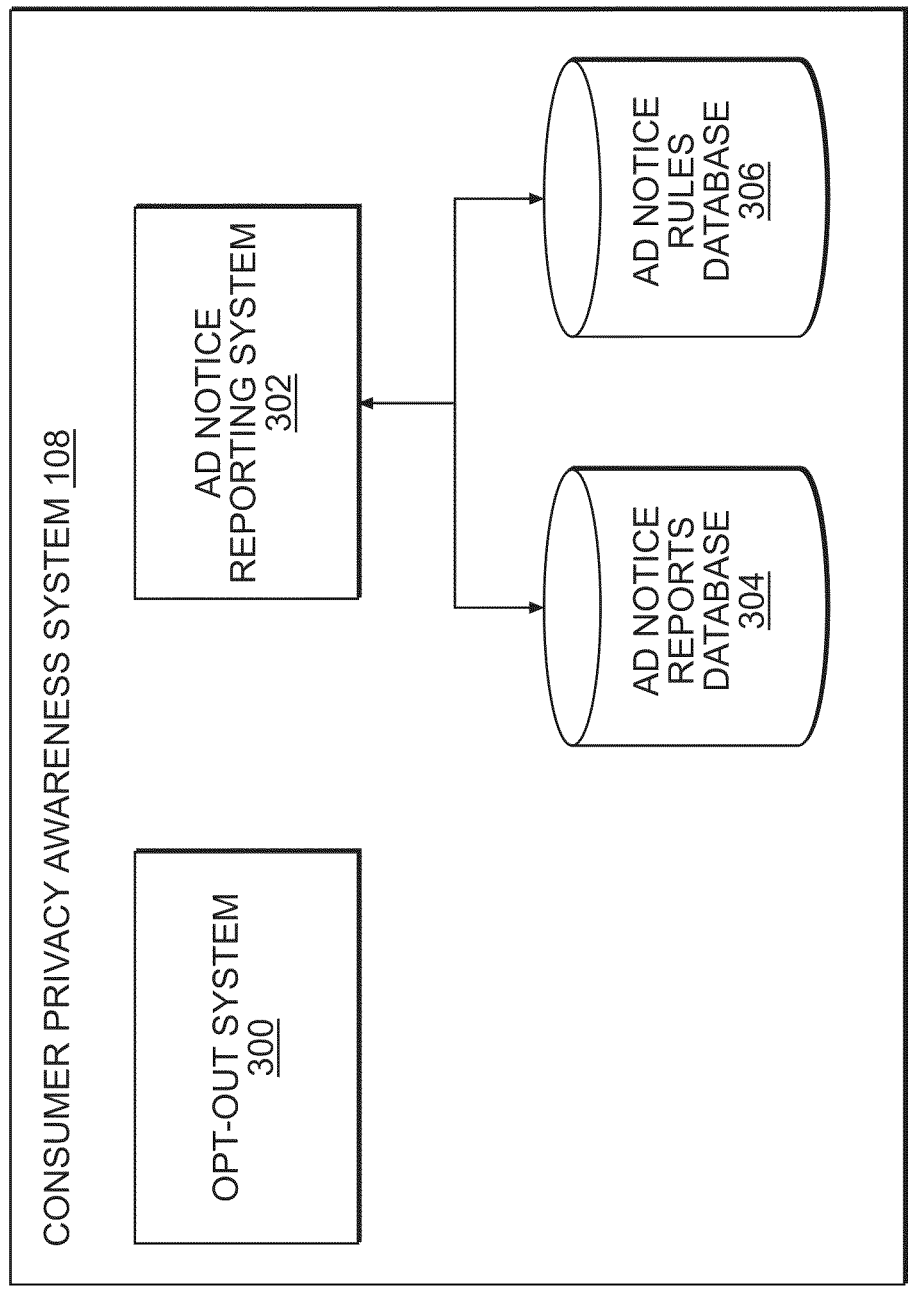
FIG. 3 shows an exemplary representation of a consumer privacy awareness system, consistent with the disclosed embodiments.

FIG. 3 illustrates an exemplary representation of privacy awareness system 108, consistent with the disclosed embodiments. Although shown embodied as a unitary entity connected to network 112, privacy awareness system 108 may alternatively or additionally by implemented by one or more other entities on network 112, such as proxy 111. As shown in FIG. 3, privacy awareness system 108 may include an opt-out system 300 and an ad notice reporting system 302. In one embodiment, opt-out system 300 may comprise one or more servers configured to assist consumers in opting-out of targeted online advertising and/or behavioral tracking. For example, opt-out system 300 may operate or host a webpage configured to receive over network 112 a request from a user device 110 to opt-out of targeted advertising by one or more ad networks and/or ad servers 106 associated with opt-out system 300. In response, opt-out system 300 may, for example, delete from the user's browser any cookies associated with selected ad networks and/or ad servers 106, delete the unique identifiers contained in the cookies, and/or store opt-out cookies for the selected ad servers or networks on the user's browser, thereby preventing further targeted advertising directed at a user of user device 110. Alternatively or additionally, opt-out system 300 may instruct selected ad networks and/or ad servers 106, publishers 104, data providers 107, ad exchanges, etc., to delete any stored user profile information associated with a user and stop online behavioral tracking of a user (i.e., "Do Not Track"). In some embodiments, opt-out system 300 may also host a consumer privacy policy page for one or more associated ad networks.

Ad notice reporting system 302 may comprise one or more servers configured to receive and store reports from user devices 110 and/or other entities on network 112 regarding alleged violations of online advertising practices or rules of an online advertising regulatory body. Specifically, in one embodiment, ad notice reporting system 302 may receive over network 112 and store reports from user devices 110 (or proxies 111) indicating instances of online advertising practices that allegedly violate the ad notice requirements of one or more self-regulating cooperatives of advertising networks (e.g., the NAI), federal government bodies (e.g., the Bureau of Consumer Protection of the FTC), state or local government consumer protection agencies, law enforcement agencies, and/or any other such entities (hereafter "ad notice requirements"). As used herein, a "violation" of the ad notice requirements means sending any ad-related communication without also sending or providing certain required ad notice metadata elements allowing the user's browser to display or access information about the nature and origin of the ad, such as one or more of ad notice metadata elements 202-216 discussed above in connection with FIG. 2. A violation could involve transmitting an ad-related communication with corrupt, improperly-formatted, misleading, or incorrect ad notice metadata 200, as well. The reports may be stored in an ad notice reports database 304 associated with ad notice reporting system 302.

Figure 4:
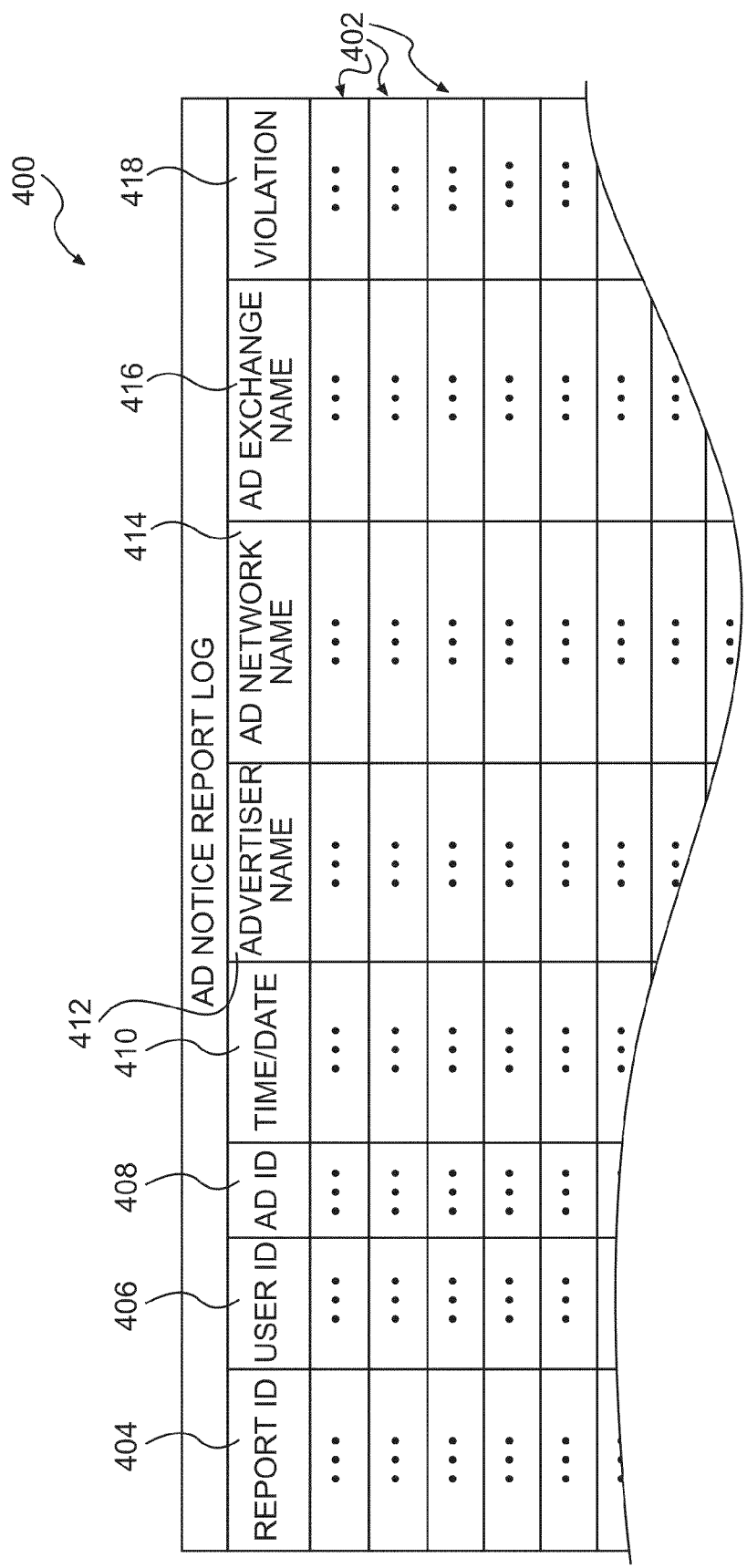
FIG. 4 shows an exemplary representation of an ad notice reports log that may be utilized by a consumer privacy awareness system, consistent with the disclosed embodiments.

FIG. 4 illustrates an exemplary ad notice reports log 400 contained in ad notice reports database 304, consistent with the disclosed embodiments. Ad notice reports log 400 may comprise, for example, a table, a matrix, a relational database, or any other data storage structure known in the art. As shown in FIG. 4, ad notice reports log 400 may include a plurality of entries 402 corresponding to different instances of alleged violations of the ad notice requirements. In one embodiment, each entry 402 may correspond to a report received from a user device 110 (or a proxy 111) of an ad-related communication that violates the ad notice requirements. Each entry 402 may include, for example, a corresponding report identifier 404, user identifier 406, ad identifier 408, time and date 410, advertiser name 412, ad network name 414, ad exchange name 416, and violation description 418.

Report identifier 404 may include a unique identifier of the report of an alleged violation of the ad notice requirements. For example, report identifier 404 may include a serial number or other information for uniquely identifying the report. In one embodiment, ad notice reporting system 302 may generate and assign a unique report identifier 404 to a report upon receiving the report from a user device 110 (or proxy 111) over network 112. In other embodiments, however, the particular user device 110 or proxy 111 reporting the alleged violation of the ad notice requirements may generate and send a report identifier 404 to ad notice reporting system 302 along with the report.

User identifier 406 may include a unique identifier of the user device 110 or proxy 111 reporting the alleged violation of the ad notice requirements. For example, user identifier 406 may include an IP address; a name, address, and telephone number; an account name; and/or any other means of uniquely identifying the user device 110 or proxy 111 reporting the alleged violation of the ad notice requirements.

Ad identifier 408 may include a unique identifier of the ad-related communication that allegedly violates the ad notice requirements. For example, ad identifier 408 may include a uniform resource identifier (URI), a uniform resource locator (URL), an IP address, or another means of uniquely identifying the particular ad from among other ads (e.g., all ads stored by ad servers 106).

Time and date 410 may include information indicating a time and date that the allegedly violative ad-related communication was received. Alternatively or additionally, time and date 410 may indicate a time and date the report of the allegedly violative ad-related communication was generated and/or sent by a user device 110 or proxy 111 to ad notice reporting system 302.

Advertiser name 412 may indicate, for example, the legal business name of the particular advertiser associated with the allegedly violative ad-related communication (e.g., ABC Company™). It is to be appreciated that, in some cases, advertiser name 412 may not be available for a particular report or entry 402, such as when the ad-related communication is served to a user device 110 without the required advertiser name metadata element 202 (FIG. 2), in violation of the ad notice requirements.

Ad network name 414 may indicate, for example, the legal business name of the entity that owns the ad network and/or ad server 106 sending the allegedly violative ad-related communication to user device 110 (e.g., Adserve Network™). It is to be appreciated that, in some cases, an ad network name 414 may not be available for a particular report or entry 402, such as when the ad-related communication is served to a user device 110 without the required ad network name metadata element 206 (FIG. 2), in violation of the ad notice requirements.

Similarly, ad exchange name 416 may indicate, for example, the legal business name of the entity that owns the ad exchange or other party providing the matching or targeting services for the allegedly violative ad-related communication (e.g., ClickTracker™). It is to be appreciated that, in some cases, an ad exchange name 416 may not be available for a particular report or entry 402, such as when the ad-related communication is served to user device 110 without the required ad exchange name metadata element 210 (FIG. 2), in violation of the ad notice requirements.

Violation 418 may contain information indicating, for example, the nature of the particular violation(s) of the ad notice requirements implicated by the allegedly violative ad-related communication. In one embodiment, violation 418 may indicate the particular ad notice metadata elements 202-216 left out of, or improperly designated in, the ad-related communication. For example, a violative ad-related communication may have been sent without one or more of the required advertiser name metadata element 202, advertiser homepage metadata element 204, ad network name metadata element 206, ad network consumer privacy page metadata element 208, ad exchange name metadata element 210, ad exchange consumer privacy page metadata element 212, or targeted advertising indicator metadata element 214 (FIG. 2). In other embodiments, however, violation 418 may indicate certain rules, laws, or other regulations allegedly violated by the ad-related communication (e.g., a specific ad notice rule of the regulatory body).

Ad notice reporting system 302 may analyze entries 402 of ad notice reports log 400 to identify or flag certain violating advertisers, ad networks, ad exchanges, etc. for further investigation and/or follow-up action (e.g., warnings, fines, sanctions, etc.). For example, ad notice reporting system 302 may be configured to execute a software algorithm to identify and flag repeat offenders of the ad notice requirements for further investigation by an administrator of ad notice reporting system 302, such as, for example, an officer of a self-regulating cooperative of advertising networks (e.g., the NAI), a federal government body (e.g., the Bureau of Consumer Protection of the FTC), a state or local government consumer protection agency, a law enforcement agency, and/or any other such entity. In some embodiments, ad notice reporting system 302 may be configured to automatically take certain actions in response to reports of violations of the ad notice requirements. For example, after a significant number of violations involving a particular advertising entity, ad notice reporting system 302 may automatically generate and send an e-mail report to any violating advertiser, ad network, ad exchange, etc. providing information regarding the circumstances of the violations. In one embodiment, the e-mail report may include the information contained in one or more entries 402 corresponding to reports of violations associated with the particular advertiser, ad network, ad exchange, etc.

Returning to FIG. 3, ad notice reporting system 302 may further include and/or otherwise be associated with an ad notice rules database 306. Ad notice rules database 306, for example, may contain information regarding the ad notice requirements and/or other online advertising practices required by self-regulating cooperatives of advertising networks (e.g., the NAI), federal government bodies (e.g., the Bureau of Consumer Protection of the FTC), state or local government consumer protection agencies, law enforcement agencies, and/or any other such entities. For example, ad notice rules database 306 may contain one or more collections of rules setting forth which ad notice metadata elements 202-216 are required to be provided along with an ad-related communication, the required structure and/or content of the metadata elements, and/or other ad notice requirement information. In one embodiment, ad notice reporting system 302 and/or administrators of ad notice reporting system 302 may use the information contained in ad notice rules database 306 to investigate the reports received from user devices 110 regarding alleged violations of the ad notice requirements, and to determine whether any follow-up action should be taken (e.g., a warning, punishment, or sanction of an ad network or advertiser).

Figure 5:
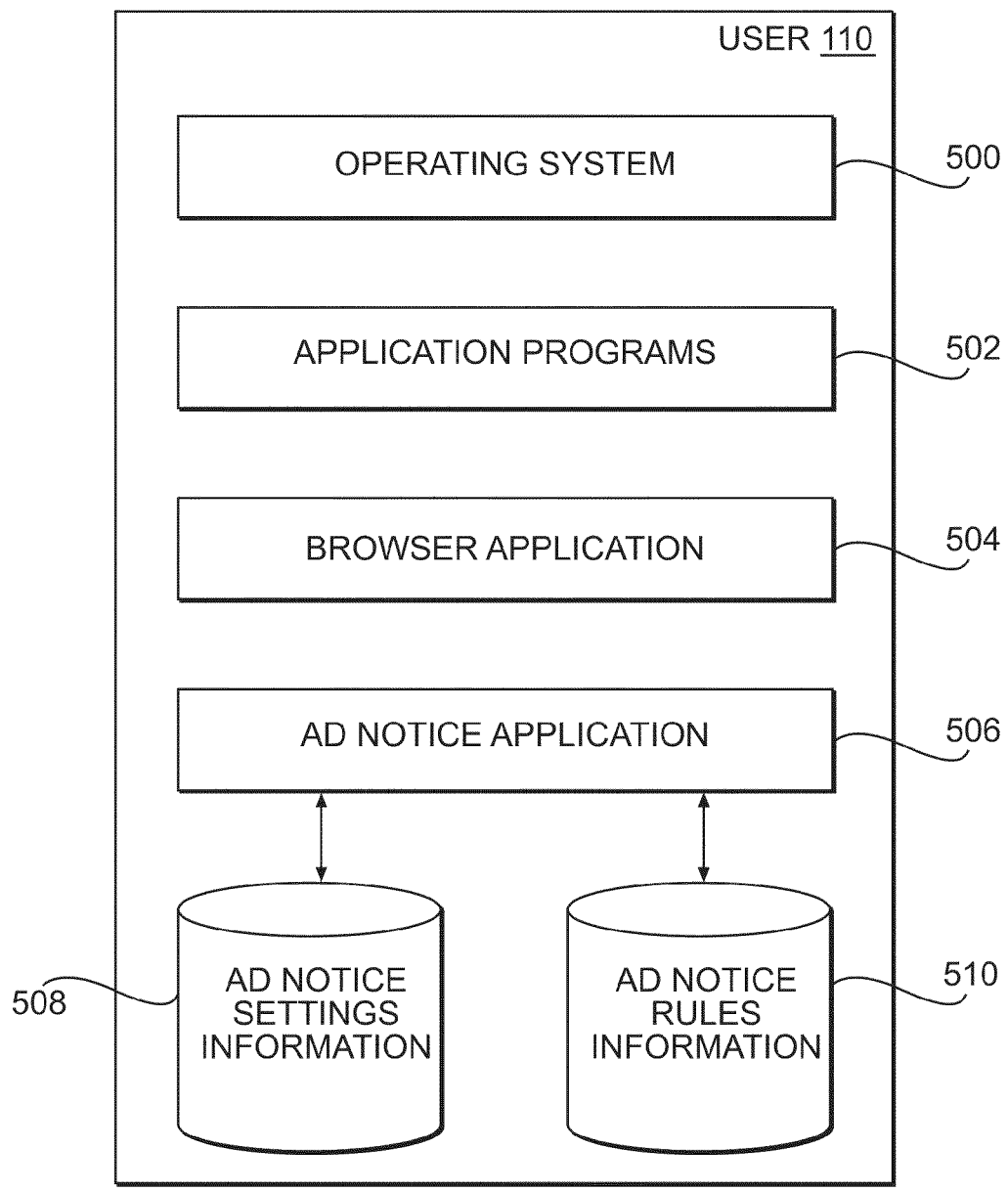
FIG. 5 shows an exemplary representation of a user device, consistent with the disclosed embodiments.

FIG. 5 illustrates an exemplary representation of elements of user device 110 that may be stored in memory and executed by a processor of user device 110, consistent with the disclosed embodiments. As shown, user device 110 may include (e.g., stored in memory) an operating system 500, application programs 502, a browser application 504, and an ad notice application 506. The processor associated with user device 110 may leverage and execute operating system 500, application programs 502, browser application 504, and ad notice application 506 in connection with the various ad notice processes disclosed herein.

Operating system 500 may DOS™, Windows™, Linux™, or any other operating system known in the art. Application programs 502 may include word processing programs, database programs, spreadsheet programs, presentation programs, and graphics programs, and/or other programs capable of generating documents or other electronic content. Web browser application 504 may include any web browser application capable of rendering standard Internet content provided by publishers 104, such as Netscape Navigator™, Microsoft Internet Explorer™, Mozilla Firefox™, Apple's Safari™, or any other web browser application known in the art.

Ad notice application 506 may include a browser plug-in associated with browser application 504, a standalone application program, or any other application configured to intercept ads on-the-fly (e.g., in real time) as they are served by ad servers 106, analyze ad notice metadata 200 (FIG. 2) served with the ads, and take one or more consumer privacy actions based on a result of the analysis. An exemplary process is discussed in further detail below in connection with the embodiment of FIG. 7.

As shown in FIG. 5, ad notice application 506 may be associated with ad notice settings information 508 and ad notice rules information 510. Ad notice settings information 508, for example, may be stored in the memory associated with user device 110 and utilized by ad notice application 506 in connection with the disclosed ad notice processes. In one embodiment, ad notice settings information 508 may contain user preference information regarding the handling ad-related communications, as they are received or transmitted, based on their associated ad notice metadata 200 (FIG. 2). For example, ad notice setting information 508 may include blocking preferences, filtering preferences, targeted advertising opt-out preferences, Do Not Track preferences, and/or any other user preference information for treating or handling ads on-the-fly based on ad notice metadata 200 (FIG. 2). In one embodiment, ad notice settings information 508 may contain information identifying the names of certain ad networks, ad exchanges, data providers 107, or other online advertising business entities, the ad-related communications of which the user desires to block. In another embodiment, ad notice settings information 508 may include information, such as a list, identifying the names of certain known "malicious" advertising business entities, the ad-related communications of which are to be blocked.

In one embodiment, such user preference information may indicate whether the user wishes to block and/or filter ad-related communications: sent without certain of the ad notice metadata elements 202-216 (FIG. 2) (i.e., violating the ad notice requirements); sent based on targeted advertising (e.g., containing "yes" in targeted advertising indicator metadata element 214); and/or associated with a certain advertiser 102, ad network, ad exchange, data provider 107, etc. (e.g., identifying certain business entities in advertiser name metadata element 202, ad network name metadata element 206, and/or ad exchange name metadata element 210). The user preference information may also indicate whether the user wishes to automatically opt-out of any ad networks or data providers 107 that practice targeted advertising and/or behavioral tracking (indicated by metadata elements 214 and/or 216). It is to be appreciated, however, that ad notice settings information 508 may contain user preference information for handing ad-related communications according to a variety of other criteria.

Ad notice rules information 510, for example, may be stored in the memory associated with user device 110 and utilized by ad notice application 506 in connection with the ad notice processes of the embodiments disclosed herein. In one embodiment, ad notice rules information 510 may include the same or similar information as ad notice rules database 306, discussed above in connection with FIG. 3. For example, ad notice rules information 510 may contain information regarding the ad notice requirements and/or other online advertising practices required by self-regulating cooperatives of advertising networks (e.g., the NAI), federal government bodies (e.g., the Bureau of Consumer Protection of the FTC), state or local government consumer protection agencies, law enforcement agencies, and/or any other such entities. For example, ad notice rules information 510 may contain one or more rule sets setting forth which ad notice metadata elements 202-216 are required to be provided with an ad-related communication, the required structure and/or content of the metadata elements, and/or other ad notice requirement information.

Figure 6:
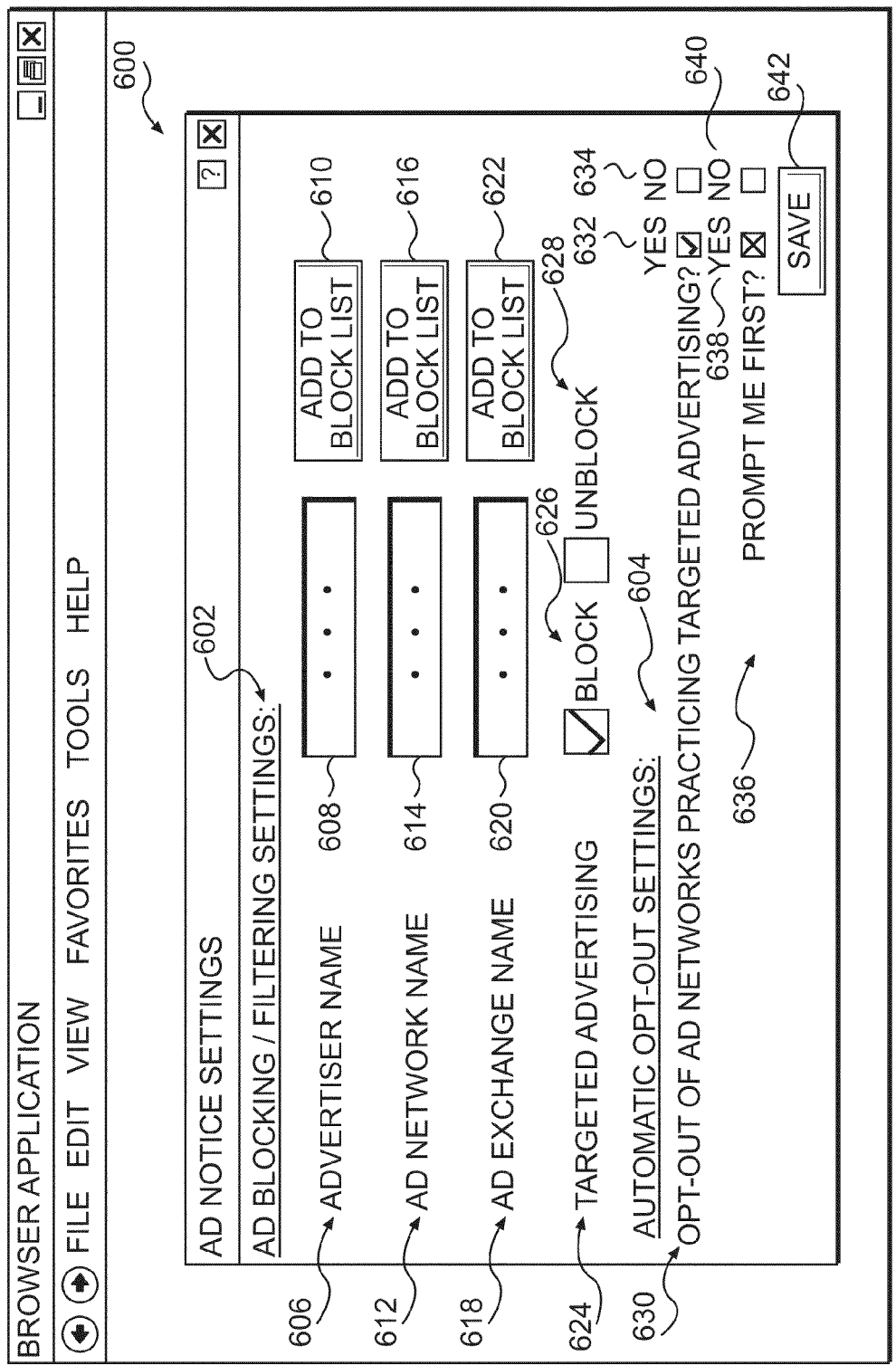
FIG. 6 shows an exemplary representation of a graphical user interface (GUI) with ad notice settings.

FIG. 6 illustrates an exemplary graphical user interface (GUI) 600 allowing a user to input ad notice settings. GUI 600 may be associated with ad notice application 506, consistent with the disclosed embodiments. In one aspect, ad notice application 506 (and ad notice settings GUI 600) may be integrated with browser application 504 to provide the disclosed ad notice functionality. For example, ad notice application 506 may be a browser plug-in, such as a Flash™ plug-in, a JavaScript™ plug-in, or another type of web application known in the art configured to execute within browser application 504. As shown in FIG. 6, in one embodiment, ad notice settings GUI 600 may include an ad blocking/filtering settings interface 602 and an automatic opt-out settings interface 604.

Ad blocking/filtering settings interface 602 may include an option 606 for blocking ad-related communications based on the name of the advertiser associated with the ad-related communication. In one embodiment, option 606 may include a user interface element 608, such as a text entry box, a drop-down menu, or another such user interface element, allowing the user to select, input, or otherwise provide the name of an advertiser (e.g., ABC Company™) whose ad-related communications the user desires to block and/or filter. After entering the name of such an advertiser, the user may select an add-to-block-list button 610 to add that particular advertiser to the user's block list. Subsequently, as discussed in further detail below, when browser application 504 and/or ad notice application 506 intercept an ad-related communication associated with the "blocked" advertiser (indicated by the accompanying advertiser name metadata element 202), browser application 504 and/or ad notice application 506 may block the ad-related communication.

Ad blocking/filtering settings interface 602 may also include an option 612 for blocking ad-related communications based on the name of the ad network associated with the ad-related communication. In one embodiment, option 612 may include a user interface element 614, such as a text entry box, a drop-down menu, or another such user interface element, allowing the user to select, input, or otherwise provide the name of an ad network (e.g., AZZA Networks™) whose ad-related communications the user desires to block and/or filter. After entering the name of such an ad network, the user may select an add-to-block-list button 616 to add that particular ad network to the user's block list. Subsequently, as discussed in further detail below, when browser application 504 and/or ad notice application 506 receives an ad-related communication associated with the "blocked" ad network (indicated by the accompanying ad network name metadata element 206), browser application 504 and/or ad notice application 506 may block the communication.

Ad blocking/filtering settings interface 602 may further include an option 618 for blocking ad-related communications based on the name of the ad exchange providing the matching services in selecting or delivering the ad. In one embodiment, option 618 may include a user interface element 620, such as a text entry box, a drop-down menu, or another such user interface element, allowing the user to select, input, or otherwise provide the name of an ad exchange or other party providing ad matching services (e.g., Click Trackers™) whose ad-related communications the user desires to block and/or filter. After entering the name of such an ad exchange, the user may select an add-to-block-list button 622 to add that particular ad exchange to the user's block list. Subsequently, as discussed in further detail below, when browser application 504 and/or ad notice application 506 receives an ad-related communication associated with the "blocked" ad exchange (indicated by the accompanying ad exchange name metadata element 210), browser application 504 and/or ad notice application 506 may block the communication.

Ad blocking/filtering settings interface 602 may further include an option 624 for blocking ad-related communications based on whether targeted advertising, user profiling, and/or online behavioral tracking was used in selecting the ad. In one embodiment, option 624 may include a "block" user interface element 626 and an "unblock" user interface element 628 (e.g., check boxes, text entry boxes, a drop-down menus, or other such user interface elements) allowing the user to select whether to block ad-related communications that involve targeted advertising, user profiling, and/or online behavioral tracking. Subsequently, as discussed in further detail below, when browser application 504 and/or ad notice application 506 intercept an ad-related communication involving targeted advertising, user profiling, and/or online behavioral tracking, as indicated by the accompanying targeted advertising indicator metadata element 214 and/or data provider metadata element 216 (i.e., "yes"), browser application 504 and/or ad notice application 506 may block the communication.

Continuing with FIG. 6, automatic opt-out settings interface 604 may include a "Do Not Track" option 630. Activation of Do Not Track option 630 may facilitate automatically opting-out of ad networks, data providers 107, and/or other entities practicing targeted advertising, user profiling, and/or online behavioral tracking. In one embodiment, option 630 may include a "Yes" user interface element 632 and a "No" user interface element 634 (e.g., check boxes, text entry boxes, drop-down menus, or other such user interface elements) allowing the user to select whether to automatically opt-out of online entities practicing targeted advertising, user profiling, and/or online behavioral tracking (i.e., "Do Not Track."). Subsequently, as discussed in further detail below, when browser application 504 and/or ad notice application 506 receives an ad-related communication sent involving targeted advertising, user profiling, and/or online behavioral tracking, as indicated by the accompanying targeted advertising indicator metadata element 214 and/or data provider metadata element 216 (i.e., "Yes"), browser application 504 and/or ad notice application 506 may automatically transmit over network 112 to opt-out system 300 (FIG. 3) a request to opt-out of targeted advertising, user profiling, and/or behavioral tracking by the particular online entities (i.e., Do Not Track). As discussed above, opt-out system 300 may then delete the associated ad network's cookie stored by the user's browser application 504, replace the unique identifier in the cookie with an "opt-out" identifier, and/or instruct the ad network or data provider 107 to delete any stored user profile information associated with user 110 and/or to discontinue tracking of the user's online activity.

In some embodiments, automatic opt-out settings interface 604 may further include an option 636 to prompt the user prior to automatically opting out of ad networks, data providers 107, or other entities practicing targeted advertising, user profiling, and/or online behavioral tracking. For example, option 636 may include a "Yes" user interface element 638 and a "No" user interface element 640 (e.g., check boxes, text entry boxes, drop-down menus, or other such user interface elements) allowing the user to select whether browser application 504 and/or ad notice application 506 should prompt the user before automatically opting-out of targeted advertising, user profiling, and/or online behavioral tracking practiced by an online entity. Selection of "Yes" user interface element 638 may cause browser application 504 and/or ad notice application 506, for example, to display a prompt to the user notifying the user that a targeted ad-related communication has been intercepted, and asking the user whether the user wishes to opt-out of future targeted advertising, user profiling, and/or online behavioral tracking by the entity (e.g., "We have intercepted an ABC Company™ advertisement targeted to you by Collins Advertising™ based on your web browser history. Would you like to opt-out of future targeted advertisements from Collins Advertising™?").

As shown in FIG. 6, ad notice settings GUI 600 may further include an option 642 to save the settings input by the user to ad blocking/filtering settings interface 602 and/or automatic opt-out settings interface 604. Selection of save option 642, for example, may cause browser application 504 and/or ad notice application 506 to update the user preferences stored in ad notice settings information 508 based on the user's input.

Figure 7:
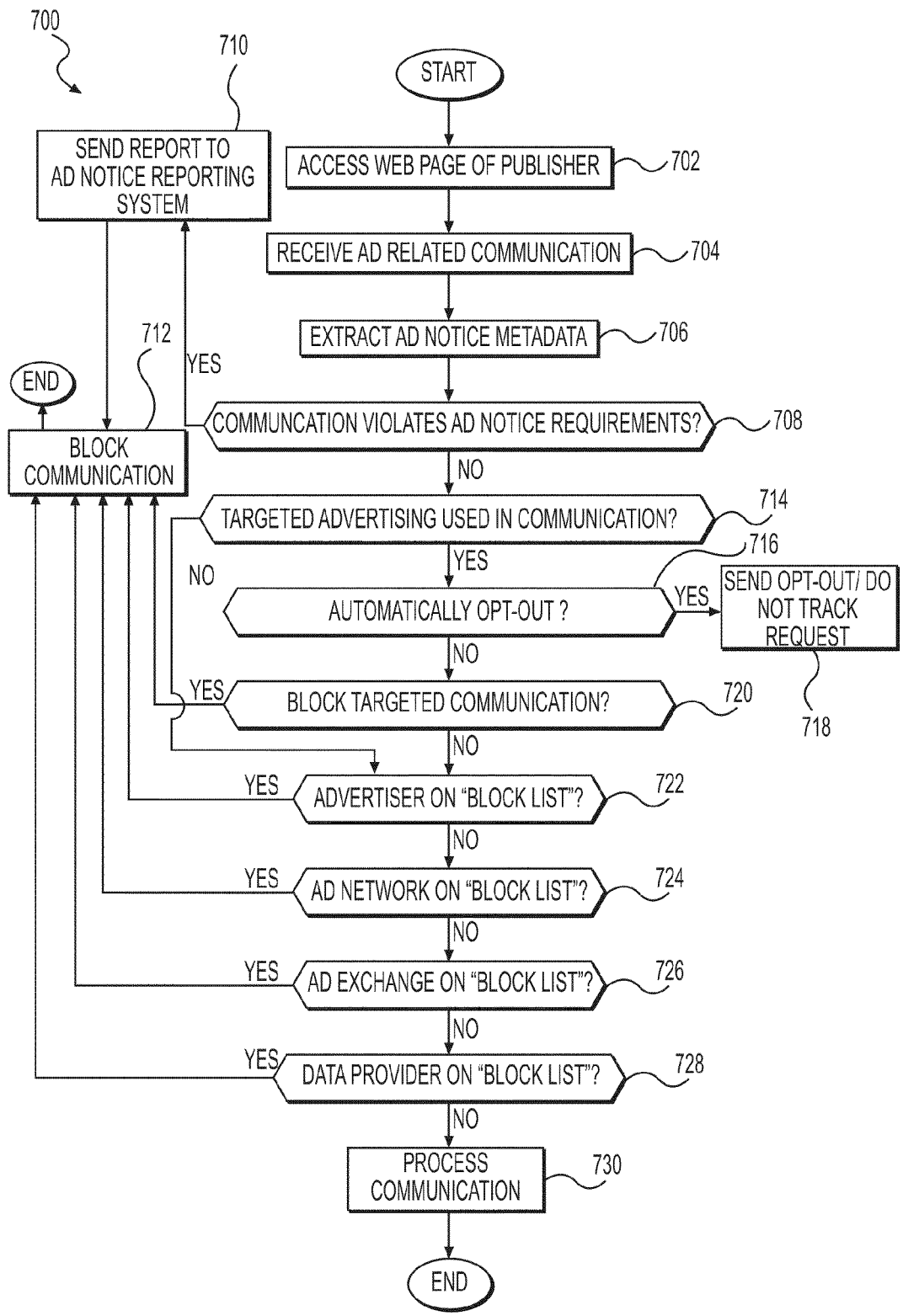
FIG. 7 shows a flowchart of an exemplary ad notice process, consistent with the disclosed embodiments.

FIG. 7 is a flowchart illustrating an exemplary ad notice process 700 that may be performed by browser application 504 and/or ad notice application 506. Specifically, the processor of user 110 may perform ad notice process 700 in connection with executing browser application 504 and/or ad notice application 506 (e.g., as a plug-in). In other embodiments, however, process 700 may be performed by a program, module, or other mechanism on proxy 111.

Method may include a user device 110 accessing a web page associated with one of publishers 104. For example, a user of user device 110 may provide input to browser application 504 requesting access to the web page of the publisher 104, such as by directly entering the URL of the web page or by using a search engine to search for and link to the web page. In response, browser application 504 may, for example, generate an HTTP request to publisher 104 for the HTML web content associated with the publisher's webpage.

Then, user device 110 may receive one or more ad-related communications (step 704). For example, browser application 504 may generate an ad-related communication in the form of an outgoing request to an ad server 106, such as an HTTP request, to provide advertising content to fill advertising space on the publisher's web page. In addition, browser application 504 may receive an ad-related communication in the form of an incoming response, such as an HTTP response, containing a uniform resource locator (URL) for an ad or a URL for another ad server 106 that can provide an ad. For example, upon receiving the request to access the publisher's web page, publisher 104 may send an HTTP ad request, along with a cookie containing a unique identifier associated with the user of user device 110, to one or more ad servers 106 in the ad network. The one or more ad servers 106, possibly in conjunction with one or more ad exchanges, may then use the unique identifier of the cookie to access user profile information associated with user 110 (e.g., provided by one or more data providers 107). Based on the user profile information and/or other information provided in the ad request, the one or more ad servers 106 and/or ad exchanges may select an ad targeted to user 110, or may identify another ad server 106 that can provide a targeted ad, and may return to the browser application 504 of the user device 110 an HTTP ad response containing information for accessing the advertisement or for requesting the ad from the other ad server 106.

In connection with the ad-related communications described in 704, the entities of online advertising environment 100 may also provide ad notice metadata 200 (FIG. 2) associated with the ad-related communications (and potentially required by one or more relevant online advertising regulatory bodies), as described above. For example, when sending an ad-related communication, one or more online advertising entities (e.g., ad severs 106), may provide an advertiser name metadata element 202, advertiser homepage metadata element 204, ad network name metadata element 206, ad network consumer privacy page metadata element 208, ad exchange name metadata element 210, ad exchange consumer privacy page metadata element 212, targeted advertising indicator metadata element 214, and/or data provider metadata element 216, specific to the ad-related communication (e.g., an HTTP request or response). For instance, as discussed above, ad servers 106 may retrieve the information required for ad notice metadata elements 202-216 from an associated database, and/or may receive this information from other entities in online advertising environment 100 during the ad selection process. Ad severs 106 may then deliver the ad notice metadata 200 to the user's browser application 504 with or in the HTTP response containing an URL for the ad or a URL for another ad server 106. In addition, if the user's browser application 504 sends an HTTP request for an ad to an ad server 106, the browser application 504 may also send any ad notice metadata 200 in its possession (e.g., stored in browser cache) to the ad sever 106.

Depending on the rules of the pertinent online advertising regulatory body (e.g., NAI), the ad notice metadata 200 may be contained in the header of an HTTP request/response, in the body of the HTTP request/response (e.g., as JavaScript (JS) metadata variables), and/or in other parts of the HTTP request/response. But in other embodiments, the ad notice metadata 200 may be sent separately from an HTTP request/response, such as before or after the HTTP response/response.

Continuing with FIG. 7, browser application 504 and/or ad notice application 506 may extract the ad notice metadata 200 associated with the ad-related communication (step 706). For example, browser application 504 and/or ad notice application 506 may parse the ad-related communication, such as an HTTP request or response, to identify the ad notice metadata elements 202-216 in the header or body thereof. In other embodiments, browser application 504 and/or ad notice application 506 may receive the ad notice metadata 200 separately.

Browser application 504 and/or ad notice application 506 may then determine whether the ad-related communication violates one or more ad notice requirements (step 708), as discussed above. For example, using ad notice rules information 510 (FIG. 5), browser application 504 and/or ad notice application 506 may determine whether the ad-related communication complies with the rules, regulations, and/or requirements of a self-regulating cooperative of advertising networks (e.g., the NAI), a federal government body (e.g., the Bureau of Consumer Protection of the FTC), a state or local government consumer protection agency, a law enforcement agency, and/or any other such entity. In one embodiment, browser application 504 and/or ad notice application 506 may determine whether any of the required ad notice metadata elements 202-216 were not sent in or with the ad-related communication, and/or whether any of the ad notice elements 202-216 are corrupt, improperly formatted, etc. If so, browser application 504 and/or ad notice application 506 may determine that the ad-related communication violates the ad notice requirements.

If browser application 504 and/or ad notice application 506 determines in step 710 that the ad-related communication does violate the ad notice requirements, browser application 504 and/or ad notice application 506 may generate and send a report to ad notice reporting system 302 (FIG. 3) over network 112 (step 710). For example, as described above in connection with FIG. 4, browser application 504 and/or ad notice application 506 may generate and send a report including a corresponding report identifier 404, user identifier 406, ad identifier 408, time and date 410, advertiser name 412 (if available), ad network name 414 (if available), ad exchange name 416 (if available), and violation 418 (e.g., ad notice metadata 200 missing a link for the ad network's consumer privacy page), based on ad notice metadata 200 and/or other information sent in or with the ad-related communication. Upon receiving the report, ad notice reporting system 302 may store a corresponding entry 402 in ad notice reports log 400 for subsequent investigation by a representative or officer of an appropriate online advertising regulatory entity, as described above.

Browser application 504 and/or ad notice application 506 may also block the ad-related communication, either before, after, or simultaneously with sending a report to ad notice reporting system 302 (step 712). For example, browser application 504 and/or ad notice application 506 may render the HTML content for the publisher's web page, but may block a violative HTTP response to prevent the content associated with the ad from being rendered and presented to the user. Alternatively, browser application 504 and/or ad notice application 506 may block a violative HTTP request, such as a request to an ad sever 106 for a targeted advertisement, from being sent.

If it is determined in step 708 that the ad-related communication does not violate the ad notice requirements, browser application 504 and/or ad notice application 506 may determine whether targeted advertising, user profiling, and/or online behavioral tracking was used in connection with the ad-related communication (step 714). For example, browser application 504 and/or ad notice application 506 may examine targeted advertising indicator metadata element 214 and/or data provider metadata element 216. If either element indicates that targeted advertising, user profiling, and/or online behavioral tracking was used in the ad-related communication, browser application 504 and/or ad notice application 506 may determine whether the user has selected to automatically opt-out of targeted advertising, user profiling, and/or online behavioral tracking by online entities (step 716) (i.e., "Do Not Track"). For example, browser application 504 and/or ad notice application 506 may look up the user's preferences in ad notice settings information 308 (FIG. 3) to determine whether the user has chosen to automatically opt-out of targeted advertising, user profiling, and/or online behavioral tracking. As part of step 716, browser application 504 and/or ad notice application 506 may also determine whether the user prefers to be prompted prior to automatically opting-out of targeted advertising, user profiling, and/or online behavioral tracking.

If it is determined in step 716 that the user has chosen to automatically opt-out of targeted advertising, user profiling, and/or online behavioral tracking, browser application 504 and/or ad notice application 506 may automatically send a request to ad notice reporting system 302 to opt-out of the ad network and/or data provider 107 indicated by ad notice metadata 200 associated with the violative ad-related communication (step 718). For example, browser application 504 and/or ad notice application 506 may send a "Do Not Track" request for the ad network and/or data provider 107. This request may be sent with or without first prompting the user, depending on the user preference settings.

Browser application 504 and/or ad notice application 506 may determine whether the user has selected to automatically block targeted ad-related communications, such as HTTP responses containing ads delivered based on user profiling and/or user tracking (step 720). For example, browser application 504 and/or ad notice application 506 may look up the user's preferences in ad notice settings information 308 (FIG. 3) to determine whether the user has chosen to automatically block such targeted ad-related communications. If so, browser application 504 and/or ad notice application 506 may block the targeted ad-related communication, as discussed above in connection with step 712.

In other embodiments, browser application 504 and/or ad notice application 506 may also determine, based on the ad notice metadata 200 associated with the ad-related communication and on ad notice settings information 508, whether any designated "malicious" business entities are associated with the ad-related communication. If so, browser application 504 and/or ad notice application 506 may block the ad-related communication, as discussed above in connection with step 712. Otherwise, processing may proceed to step 722. Processing may also proceed to step 722 if it is determined in step 714 that targeted advertising and/or user profiling was not used in serving the ad-related communication.

In step 722, browser application 504 and/or ad notice application 506 may determine whether the advertiser 102 associated with the ad-related communication is on the user's "block list." For example, browser application 504 and/or ad notice application 506 may look up the user's preferences in ad notice settings information 308 (FIG. 3) to determine whether user device 110 has chosen to automatically block ad-related communications associated with the particular advertiser 102 indicated in the advertiser name metadata element 202 (FIG. 2) included in or with the ad-related communication. If so, browser application 504 and/or ad notice application 506 may block the targeted ad-related communication, as discussed above in connection with step 712. Otherwise, processing may proceed to step 724.

In step 724, browser application 504 and/or ad notice application 506 may determine whether the ad network associated with the ad-related communication is on the user's "block list." For example, browser application 504 and/or ad notice application 506 may look up the user's preferences in ad notice settings information 308 (FIG. 3) to determine whether user device 110 has chosen to automatically block ad-related communications associated with the particular ad network indicated in the ad network name metadata element 206 (FIG. 2) included in or with the ad-related communication. If so, browser application 504 and/or ad notice application 506 may block the ad-related communication, as discussed above in connection with step 712. Otherwise, processing may proceed to step 726.

In step 726, browser application 504 and/or ad notice application 506 may determine whether the ad exchange or other party that provided the matching services in delivering the ad-related communication is on the user's "block list." For example, browser application 504 and/or ad notice application 506 may look up the user's preferences in ad notice settings information 308 (FIG. 3) to determine whether user device 110 has chosen to automatically block ad-related communications associated with the particular ad exchange indicated in the ad exchange name metadata element 210 (FIG. 2) sent in or with ad-related communication. If so, browser application 504 and/or ad notice application 506 may block the ad-related communication, as discussed above in connection with step 712. Otherwise, processing may proceed to step 728.

In step 728, browser application 504 and/or ad notice application 506 may determine whether the data provider 107 that provided information about the user to for targeting the ad is on the user's "block list." For example, browser application 504 and/or ad notice application 506 may look up the user's preferences in ad notice settings information 308 (FIG. 3) to determine whether user device 110 has chosen to automatically block ad-related communications associated with the particular data provider 107 indicated in the data provider metadata element 216 (FIG. 2) sent in or with ad-related communication. If so, browser application 504 and/or ad notice application 506 may block the ad-related communication, as discussed above in connection with step 712. Otherwise, processing may proceed to step 730.

In step 730, browser application 504 and/or ad notice application 506 may process the ad-related communication. For example, if the ad-related communication is an HTTP response containing a URL for an advertisement or a URL to request the advertisement from another ad sever 106, browser application 504 and/or ad notice application 506 may render the HTML content associated with the publisher's web page, as well as request and render the content associated with the ad. In rendering the content associated with the ad, browser application 504 and/or ad notice application 506 may also render a graphical "Interstitial Overlay" of ad notice metadata 200 served with the ad, allowing user device 110 to view and access further information about the origin and nature of the ad, if desired. If the ad-related communication is an HTTP request coming from the user's browser (e.g., a request to an ad server 106 for a targeted ad), browser application 504 and/or ad notice application 506 may permit the request to be transmitted on network 112.

The disclosed embodiments may provide enhanced consumer privacy in connection with, for example, online advertising environments. By leveraging one or more ad notice metadata elements served with an ad-related communication, such as the name of the advertiser associated with the ad, the name of the ad network serving the ad, and the name of any ad exchange providing the matching services for the ad, various user-side privacy strategies may be employed. For example, based on user preferences, browsers may automatically block or filter ad-related communications associated with certain advertisers, ad networks, and/or ad exchanges. Further, users may be able to automatically opt-out of ad networks and/or ad exchanges that practice user profiling, targeting, and/or tracking practices, in response to receiving an ad-related communication served with metadata indicating that such practices were used in selecting the ad. In addition, by analyzing the ad notice metadata elements sent with the ad-related communication, the user's browser may automatically report communications that do not comply with the rules or regulations of cooperatives of advertising networks (e.g., the NAI), federal government bodies (e.g., the Bureau of Consumer Protection of the FTC), state or local government consumer protection agencies, law enforcement agencies, and/or any other such entities. If warranted, these entities may take further action to warn or sanction online advertising companies that do not comply with the rules or regulations.

Although the exemplary ad notice process 700 (FIG. 7) is described above primarily as being performed by the browser applications 504 and/or the ad notice applications 506 of the user devices 110, it is to be appreciated that other components or entities in online advertising environment 100 may alternatively or additionally perform at least some steps of ad notice process 700. For example, in certain embodiments, consumer privacy awareness system 108 may be configured as a third-party system that provides various consumer privacy functionality for many user devices 110. Alternatively or additionally, proxy 111 may perform at least some steps of ad notice process 700. For example, in one exemplary configuration, a consumer privacy proxy 111, such as an Internet Service Provider (ISP) or another entity between user devices 110 and network 112, may intercept the ad-related communications. The proxy 111 may then analyze ad notice metadata 200 sent with the ad-related communications to determine whether the communications comply with the ad notice requirements (and take appropriate action if not), as discussed above in connection with FIG. 7. In addition, the proxy 111 may determine, based on stored user preference information and/or the names of the various business entities associated with the ads indicated by ad notice metadata 200, whether to block the communications, filter the communications, and/or to opt users out of targeted advertising or behavioral tracking (i.e., "Do Not Track) by the online entities associated with the communications. In such a configuration, some or all of the ad notice process 700 may be handled by the proxy and "transparent" to user devices 110. Other such configurations will become apparent to one of ordinary skill in the art upon considering the principles of the disclosure.

One skilled in the art will appreciate that computer programs for implementing the disclosure may be stored on and/or read from computer-readable storage media. The computer-readable storage media may have stored thereon computer-executable instructions which, when executed by a computer, cause the computer to perform, among other things, the processes disclosed herein. Exemplary computer-readable storage media may include magnetic storage devices, such as a hard disk, a floppy disk, magnetic tape, or another magnetic storage device known in the art; optical storage devices, such as CD-ROM, DVD-ROM, or another optical storage device known in the art; and/or electronic storage devices, such as EPROM, a flash drive, or another integrated circuit storage device known in the art. The computer-readable storage media may be embodied by or in one or more components of online advertising environment 100 (FIG. 1).

One skilled in the art will further realize that the processes illustrated in this description may be implemented in a variety of ways and may include multiple other modules, programs, applications, scripts, processes, threads, or code sections that may all functionally interrelate to accomplish the individual tasks described above. For example, it is contemplated that these programs modules may be implemented using commercially available software tools, using custom object-oriented code written in the C++ programming language, using applets written in the Java programming language, or may be implemented as with discrete electrical components or as one or more hardwired application specific integrated circuits (ASIC) custom designed for this purpose. In addition, embodiments consistent with the present disclosure may be implemented in a variety of different data communication network environments and may use software, hardware, or a combination of hardware and software to provide the disclosed functions.

It will be apparent to those skilled in the art that various modifications and variations can be made to the exemplary systems and methods disclosed herein. It is intended that the disclosed embodiments be considered as exemplary only, with a true scope of the invention being indicated by the following claims and their equivalents.

What is claimed is:

1. A computer-implemented method for protecting consumer privacy in an online advertising environment, the method comprising:
    receiving, at a computing device executing online advertising consumer privacy instructions, an ad-related communication with associated ad notice metadata containing information about the ad-related communication;
    accessing ad notice rules identifying ad notice metadata elements required to be served with online ads, the ad notice rules being associated with an online advertising regulatory body;
    analyzing the ad notice metadata associated with the ad-related communication to determine whether the ad-related communication is missing at least one ad notice metadata element required by the ad notice rules; and
    triggering, based upon a determination that the ad-related communication is missing at least one ad notice metadata element required by the ad notice rules, execution of a consumer privacy response, the consumer privacy response including automatically sending a report of a determined violation of the rules to an ad notice reporting system.

2. The method of claim 1, wherein the ad notice metadata includes an identification of at least one of:
    an advertiser associated with the ad-related communication;
    an ad network associated with the ad-related communication;
    an ad exchange providing matching services associated with the ad-related communication;
    a data provider providing information about a target of the ad-related communication;
    a web page associated with the advertiser;
    a consumer privacy web page associated with the ad network;
    a consumer privacy web page associated with the ad exchange; and
    whether user profiling was used in connection with the ad-related communication.

3. The method of claim 1, wherein the consumer privacy response further includes at least one of blocking the ad-related communication, automatically opting a user out of targeted online advertising, or initiating a Do Not Track action.

4. The method of claim 1, wherein the ad-related communication includes a request for an advertisement sent from a web browser of a client device to an ad server.

5. The method of claim 4, wherein the ad notice metadata is contained in a header of the request.

6. The method of claim 1, wherein the ad-related communication includes a response by an ad server to an ad request received from a client device.

7. The method of claim 1, wherein the ad notice metadata is contained in a header of the response.

8. A non-transitory computer-readable storage medium storing a set of instructions that, when executed by at least one processor, causes the at least one processor to perform a method for protecting consumer privacy in an online advertising environment, the method comprising:
    receiving an ad-related communication with associated ad notice metadata containing information about the ad-related communication;
    accessing ad notice rules identifying ad notice metadata elements required to be served with online ads, the ad notice rules being associated with an online advertising regulatory body;
    analyzing the ad notice metadata associated with the ad-related communication to determine whether the ad-related communication is missing at least one ad notice metadata element required by the ad notice rules; and
    triggering, based upon a determination that the ad-related communication is missing at least one ad notice metadata element required by the ad notice rules, a consumer privacy response, the consumer privacy response including automatically sending a report of a determined violation of the rules to an ad notice reporting system.

9. The computer-readable storage medium of claim 8, wherein the ad notice metadata includes an identification of at least one of:
    an advertiser associated with the ad-related communication;
    an ad network associated with the ad-related communication;

an ad exchange providing matching services associated with the ad-related communication;

a data provider providing information about a target of the ad-related communication;

a web page associated with the advertiser;

a consumer privacy web page associated with the ad network;

a consumer privacy web page associated with the ad exchange; and whether user profiling was used in connection with the ad-related communication.

10. The computer-readable storage medium of claim 8, wherein the consumer privacy response further includes at least one of blocking the ad-related communication, automatically opting a user out of targeted online advertising, or initiating a Do Not Track action.

11. The computer-readable storage medium of claim 8, wherein the ad-related communication includes a request for an advertisement sent from a web browser of a client device to an ad server.

12. The computer-readable storage medium of claim 11, wherein the ad notice metadata is contained in a header of the request.

13. The computer-readable storage medium of claim 8, wherein the ad-related communication includes a response by an ad server to an ad request received from a client device.

14. The computer-readable storage medium of claim 8, wherein the ad notice metadata is contained in a header of the response.

15. A computer-implemented method for protecting consumer privacy in an online advertising environment, the method comprising:

receiving, at a computing device executing online advertising consumer privacy instructions, an ad-related communication;

receiving ad notice metadata associated with the ad-related communication and containing information about the origin and nature of the ad-related communication;

accessing ad notice rules identifying ad notice metadata elements required to be served with online ads, the ad notices rules being associated with an online advertising regulatory body;

analyzing the ad notice metadata to determine whether the ad-related communication is missing at least one ad notice metadata element required by the ad notice rules; and triggering, based upon a determination that the ad-related communication is missing at least one ad notice metadata element required by the ad notice rules, execution of a consumer privacy response, the consumer privacy response including automatically sending a report of a determined violation of the rules to an ad notice reporting system.

16. The method of claim 15, wherein the ad notice metadata includes an identification of at least one of:

an advertiser associated with the ad-related communication;

an ad network associated with the ad-related communication;

an ad exchange providing matching services associated with the ad-related communication;

a data provider providing information about a target of the ad-related communication;

a web page associated with the advertiser;

a consumer privacy web page associated with the ad network;

a consumer privacy web page associated with the ad exchange; and whether user profiling was used in connection with the ad-related communication.

17. The method of claim 15, wherein the consumer privacy response further includes at least one of blocking the ad-related communication, opting a user out of targeted online advertising, or initiating a Do Not Track Action.

18. The method of claim 15, wherein the ad-related communication includes at least one of a request for an advertisement sent from a web browser of a client device to an ad server or a response by the ad server to the request.

* * * * *